(12) United States Patent
Turner

(10) Patent No.: US 6,779,276 B1
(45) Date of Patent: Aug. 24, 2004

(54) LEVEL SYSTEM

(75) Inventor: David G. Turner, 1504 3rd St. NE., Mandan, ND (US) 58554

(73) Assignee: David G. Turner, Mandan, ND (US)

( * ) Notice: Subject to any disclaimer, the term of this patent is extended or adjusted under 35 U.S.C. 154(b) by 0 days.

(21) Appl. No.: 10/601,710

(22) Filed: Jun. 19, 2003

(51) Int. Cl.$^7$ ................................................ G01C 9/00
(52) U.S. Cl. .............................. 33/379; 33/351; 33/377; 33/389; 33/391; 33/396
(58) Field of Search .................... 33/379, 351, 353, 33/366.24, 377, 378, 389, 391, 396, 397

(56) References Cited

U.S. PATENT DOCUMENTS

| | | | |
|---|---|---|---|
| 1,552,691 A | * 9/1925 | Girvin | 33/378 |
| 2,595,109 A | * 4/1952 | Steady | 33/378 |
| 3,533,167 A | * 10/1970 | Thompson et al. | 33/351 |
| 3,956,831 A | * 5/1976 | Sibley | 33/391 |
| 4,026,034 A | 5/1977 | Stewart | 33/338 |
| 4,063,366 A | * 12/1977 | Bane | 33/366 |
| 4,096,638 A | * 6/1978 | Schimming | 33/396 |
| 4,229,885 A | 10/1980 | Chiou | 33/376 |
| 4,395,829 A | 8/1983 | Loftus | 33/352 |
| 4,438,720 A | * 3/1984 | Conn | 33/379 |
| 4,565,010 A | 1/1986 | Herman | 33/366 |
| 4,586,263 A | 5/1986 | Brattain | 33/353 |
| 4,592,147 A | 6/1986 | Herman | 33/366 |
| 4,604,812 A | 8/1986 | Arjomand | 33/387 |
| 4,747,217 A | 5/1988 | Austin | 33/391 |
| 4,843,725 A | 7/1989 | Harris | 33/391 |
| 4,897,824 A | * 1/1990 | Stokes | 33/378 |
| 4,914,823 A | 4/1990 | Harris | 33/378 |
| 5,074,509 A | 12/1991 | Van Orden | 248/231.5 |
| 5,303,480 A | 4/1994 | Chek | 33/512 |
| 5,669,258 A | * 9/1997 | Luebke | 33/377 |
| 6,032,376 A | 3/2000 | Shurtleff | 33/391 |
| 6,133,996 A | 10/2000 | Plumb et al. | 356/138 |

\* cited by examiner

*Primary Examiner*—Diego Gutierrez
*Assistant Examiner*—Amanda J Hoolahan

(57) ABSTRACT

A level system for accurately and efficiently providing a levelness measurement. The level system includes a container positionable within a frame structure for retaining a volume of liquid, a upper compartment within an upper portion of the container for retaining a buoyant member, a first paddle and a second paddle pivotally attached within the container about the buoyant member, and an indicator member attached to the paddles for indicating a levelness or plumbness of a structure. As the buoyant member moves within the upper compartment, the paddles move the indicator member accordingly.

20 Claims, 6 Drawing Sheets

LEVEL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to levels and more specifically it relates to a level system for accurately and efficiently providing a levelness measurement.

2. Description of the Related Art

Levels have been in use for years for measuring plumb, level, 45 degrees and other angular measurements. One example of a well-known level is the vial level that includes box levels, I-beam levels, torpedo levels and the like. U.S. Pat. No. 4,571,845 illustrates an exemplary bubble level within a ruler structure. The present invention may be utilized within any of these types of level structures. The vial level is comprised of an elongate level housing with at least one straight surface and a bubble indicator positioned within level housing. The bubble indicator typically is comprised of a transparent elongate tubular vial structure that has a longitudinal axis parallel, transverse, or angled with respect to the straight surface of the level housing. The vial structure is filled with a liquid and a bubble is positioned within the vial structure. A plurality of transverse indicia lines are within the vial structure to indicate levelness of the housing. The user positions the straight surface of the level housing against an object or structure to be measured for levelness. The bubble within the vial structure moves to the highest portion of the vial structure and is generally centered when a desired angle (e.g. level, plumb, 45 degrees, etc.) is measured.

However, it can be difficult to accurate monitor the bubble within the vial structure. Conventional vial levels are typically not known for their accuracy and are usually utilized in applications where accuracy is not a significant issue. In addition, in some lighting conditions it can be difficult to view the bubble within the liquid.

Various other levels have been recently created in an attempt to improve the accuracy of levels such as laser levels, electronic levels and the like. However, these tools tend to be expensive to purchase and maintain.

Examples of patented devices which may be related to the present invention include U.S. Pat. No. 4,914,823 to Harris; U.S. Pat. No. 4,395,829 to Loftus; U.S. Pat. No. 4,586,263 to Bratttain; U.S. Pat. No. 6,133,996 to Plumb et al.; U.S. Pat. No. 4,604,812 to Arjomand; U.S. Pat. No. 4,229,885 to Chiou; U.S. Pat. No. 4,747,217 to Austin; U.S. Pat. No. 6,032,376 to Shurtleff; U.S. Pat. No. 4,843,725 to Harris; U.S. Pat. No. 4,565,010 to Herman; U.S. Pat. No. 5,074,509 to Van Orden; U.S. Pat. No. 4,592,147 to Herman; U.S. Pat. No. 4,026,034 to Stewart; and U.S. Pat. No. 5,303,480 to Chek.

While these devices may be suitable for the particular purpose to which they address, they are not as suitable for accurately and efficiently providing a levelness measurement. Conventional levels are either not accurate or are expensive to utilize.

In these respects, the level system according to the present invention substantially departs from the conventional concepts and designs of the prior art, and in so doing provides an apparatus primarily developed for the purpose of accurately and efficiently providing a levelness measurement.

BRIEF SUMMARY OF THE INVENTION

In view of the foregoing disadvantages inherent in the known types of levels now present in the prior art, the present invention provides a new level system construction wherein the same can be utilized for accurately and efficiently providing a levelness measurement.

The general purpose of the present invention, which will be described subsequently in greater detail, is to provide a new level system that has many of the advantages of the levels mentioned heretofore and many novel features that result in a new level system which is not anticipated, rendered obvious, suggested, or even implied by any of the prior art levels, either alone or in any combination thereof.

To attain this, the present invention generally comprises a container positionable within a frame structure for retaining a volume of liquid, a upper compartment within an upper portion of the container for retaining a buoyant member, a first paddle and a second paddle pivotally attached within the container about the buoyant member, and an indicator member attached to the paddles for indicating a levelness or plumbness of a structure. As the buoyant member moves within the upper compartment, the paddles move the indicator member accordingly.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a level system that will overcome the shortcomings of the prior art devices.

A second object is to provide a level system for accurately and efficiently providing a levelness measurement.

Another object is to provide a level system that establishes a true level and plumb.

An additional object is to provide a level system that is easier to read than conventional bubble levels.

A further object is to provide a level system that does not require any batteries or calibration.

Another object is to provide a level system that may be utilized within various level structures.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
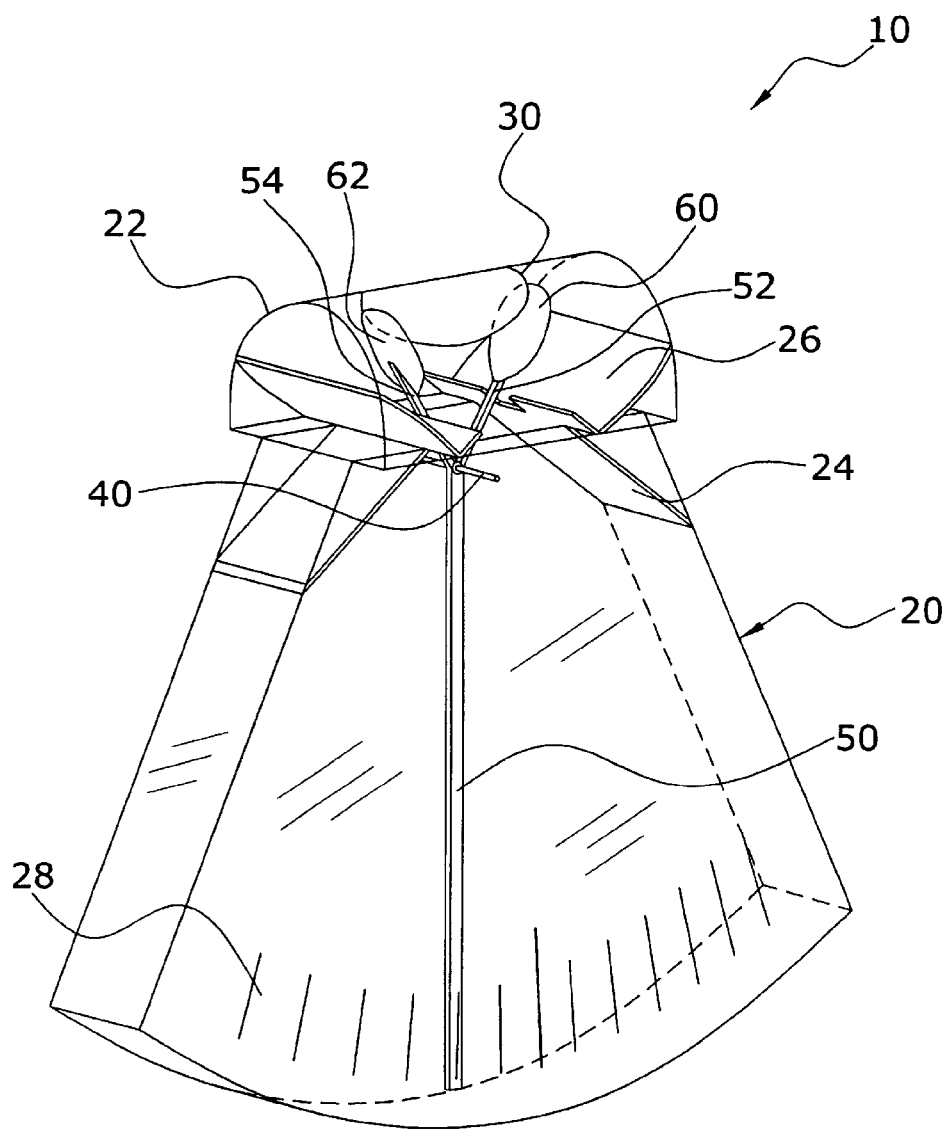
FIG. 1 is an upper perspective view of the present invention.

Turning now descriptively to the drawings, in which similar reference characters denote similar elements throughout the several views, FIGS. 1 through 6 illustrate a level system 10, which comprises a container 20 positionable within a frame structure 12 for retaining a volume of liquid, a upper compartment 22 within an upper portion of the container 20 for retaining a buoyant member 30, a first paddle 60 and a second paddle 62 pivotally attached within the container 20 about the buoyant member 30, and an indicator member 50 attached to the paddles 60, 62 for indicating a levelness or plumbness of a structure. As the buoyant member 30 moves within the upper compartment 22, the paddles move the indicator member 50 accordingly.

B. Container

As best shown in FIG. 1, a container 20 is provided capable of storing and containing a volume of liquid. The liquid may be comprised of various types of liquids commonly utilized within the bubble level industry. The liquid may be transparent, semi-transparent or colored.

Figure 2:
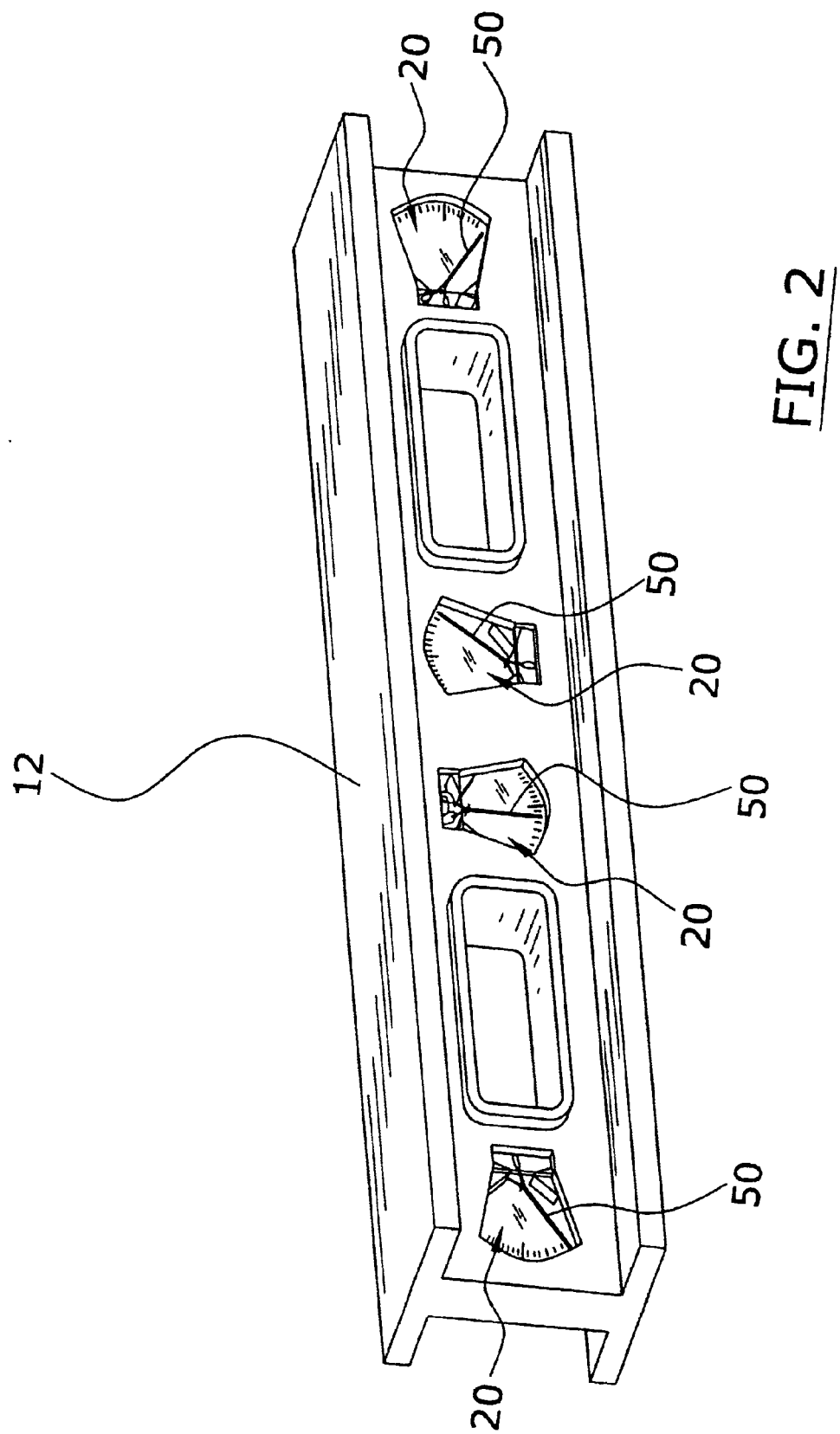
FIG. 2 is an upper perspective view of the present invention within a frame structure.

The container 20 may have various shapes and structures other than illustrated in FIG. 1 of the drawings. The container 20 is positionable within any frame structure 12 commonly utilized within the level industry such as but not limited to box, I-beam, ruler, and torpedo level structures. The container 20 may be positioned at various angles within the frame structure 12 to provide various measurements such as level, plumb and a specific angle as shown in FIG. 2 of the drawings.

FIG. 1 illustrates the container 20 having an upper compartment 22 and a lower compartment. The lower compartment preferably is broader and has a fanned structure to allow movement of the indicator member 50 in a pivoting manner. The lower compartment is preferably transparent or semi-transparent to allow for viewing of the indicator member 50 within.

Figure 6:
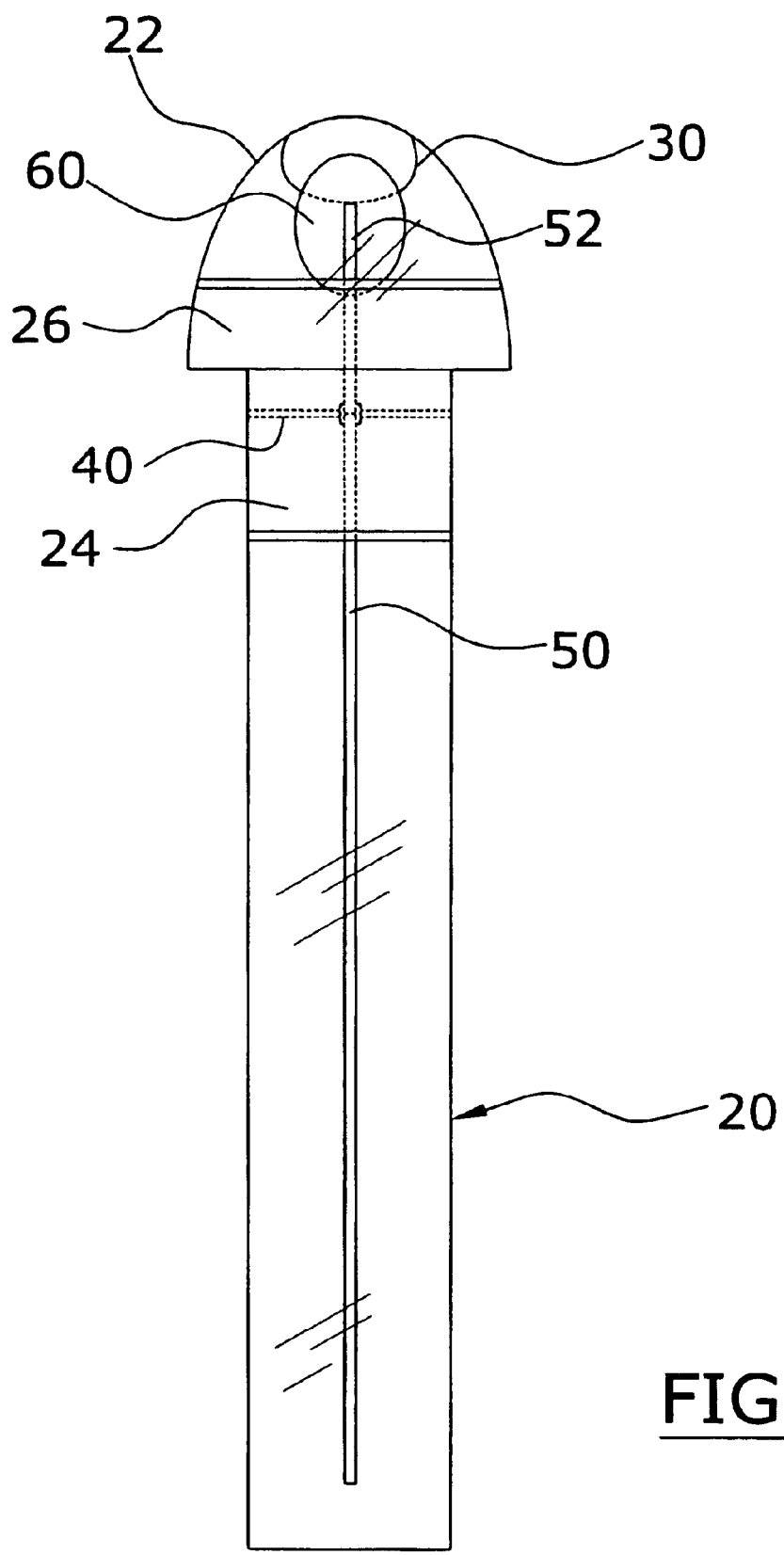
FIG. 6 is a side view of the present invention.

The upper compartment 22 within the container 20 preferably has a straight ceiling that the buoyant member 30 is positionable against. The ceiling within the upper compartment 22 preferably has a curved cross sectional structure similar to conventional bubble vials for levels as best illustrated in FIGS. 1 and 6 of the drawings. Various other structures may be utilized to construct the upper compartment 22 as can be appreciated by one skilled in the art.

The container 20 preferably includes a plurality of measurement indicia 28 which may be comprised of lines, numbers, or other symbolic structures. The measurement indicia 28 preferably include a center indicia 28 indicating level or plumb. The center indicia 28 is preferably substantially transverse with respect to the longitudinal axis of the ceiling of the upper compartment 22.

C. Buoyant Member

The buoyant member 30 is positionable within the upper compartment 22 as best shown in FIGS. 1, 3, 4 and 5 of the drawings. The buoyant member 30 is comprised of any structure/material that is buoyant within the liquid within the container 20 such as but not limited to a gas bubble, a fluid, plastic member, cork, or other buoyant material/structure. The buoyant member 30 may have various shapes, sizes and configurations other than shown in the attached drawings.

D. Paddles

Figure 3:
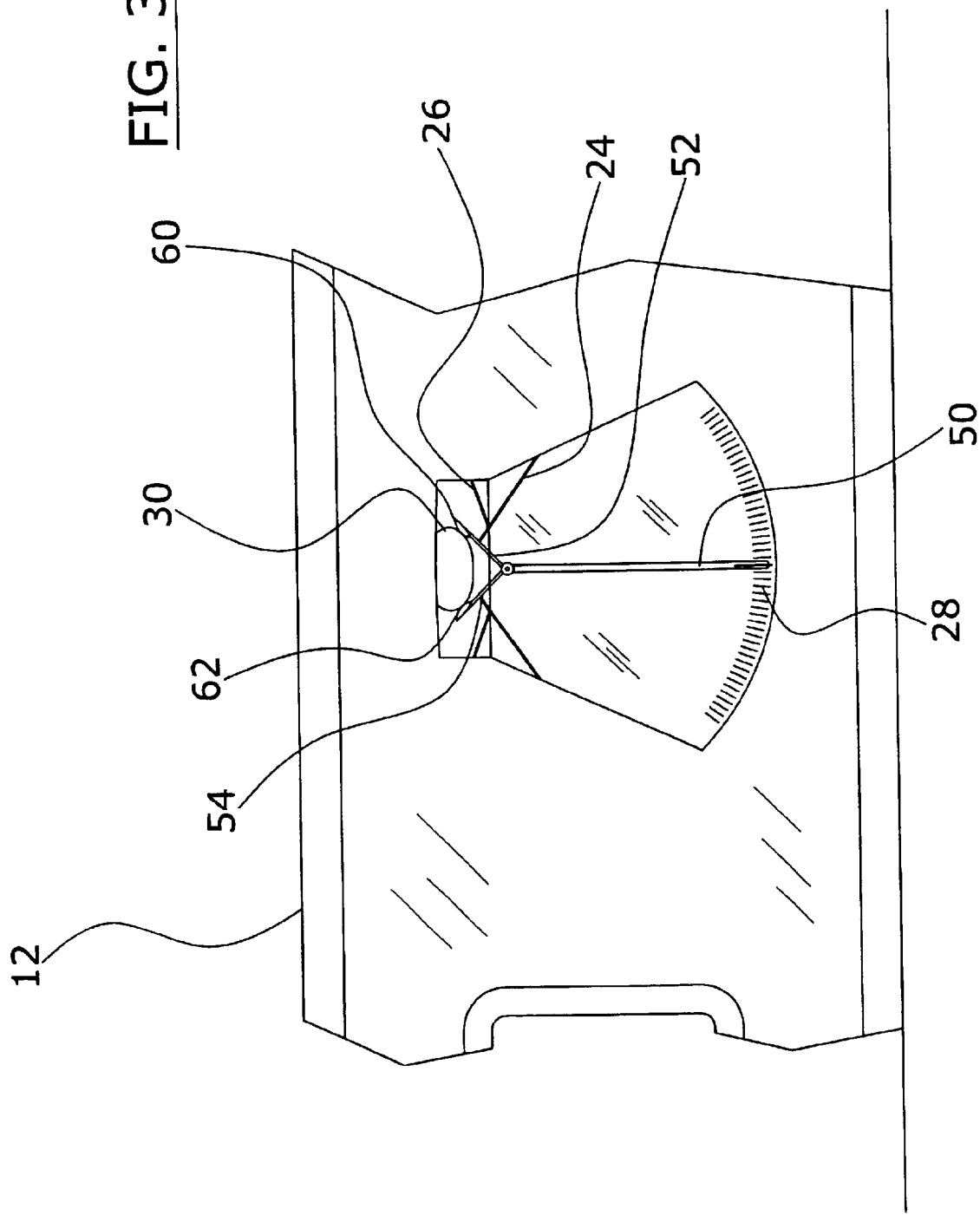
FIG. 3 is a front view of the present invention illustrating a level indication of a surface.

A first paddle 60 is connected to a first arm 52 and a second paddle 62 is connected to a second arm 54 as shown in FIGS. 1 and 3 of the drawings. The first arm 52 and the second arm 54 are pivotally positioned within the container 20 thereby supporting the first paddle 60 and the second paddle 62 in a pivotal manner within the container 20.

The first arm 52 and the second arm 54 preferably form a V-shaped structure as best shown in FIGS. 1 and 3 of the drawings. The first paddle 60 and the second paddle 62 are positioned on opposing sides of the buoyant member 30 so that the buoyant member 30 manipulates the paddles 60, 62 depending upon the position of the buoyant member 30.

As shown in FIG. 6 of the drawings, an axle 40 is positioned within the container 20 that pivotally supports the first arm 52 and the second arm 54. The axle 40 may be pivotally positioned within the container 20 or the axle 40 may simply pivotally support the arms 52, 54. The axle 40 is preferably transverse with respect to the longitudinal axis of the upper compartment 22.

E. Indicator Member

The indicator member 50 is attached to the paddles 60, 62 and the arms 52, 54. The indicator member 50 is preferably comprised of an elongate needle like structure as shown in FIGS. 1 through 6 of the drawings, however the indicator member 50 may be comprised of various other mechanical structures pivotally positionable within the container 20.

F. Diverters

As shown in FIGS. 1 and 3 of the drawings, a pair of lower diverters 24 are positioned within opposing sides of the container 20 for directing the buoyant member 30 between the paddles. In a situation where the buoyant member 30 has passed into the lower compartment and is attempting to return to the upper compartment 22 of the container 20, the lower diverters 24 direct the buoyant member 30 toward a central location of the upper compartment 22 between the paddles 60, 62.

In addition, a pair of upper diverters 26 are within the container 20 that extend at an angle from the lower diverters 24 respectively as best shown in FIGS. 1 and 3 of the drawings. The lower diverters 24 and the upper diverters 26 form a V-shaped structure as further shown in FIG. 3 of the drawings. The lower diverters 24 preferably extend past the upper diverters 26 and each contain a slot for receiving a portion of the paddles 60, 62 or arms 52, 54.

G. Operation

Figure 4:
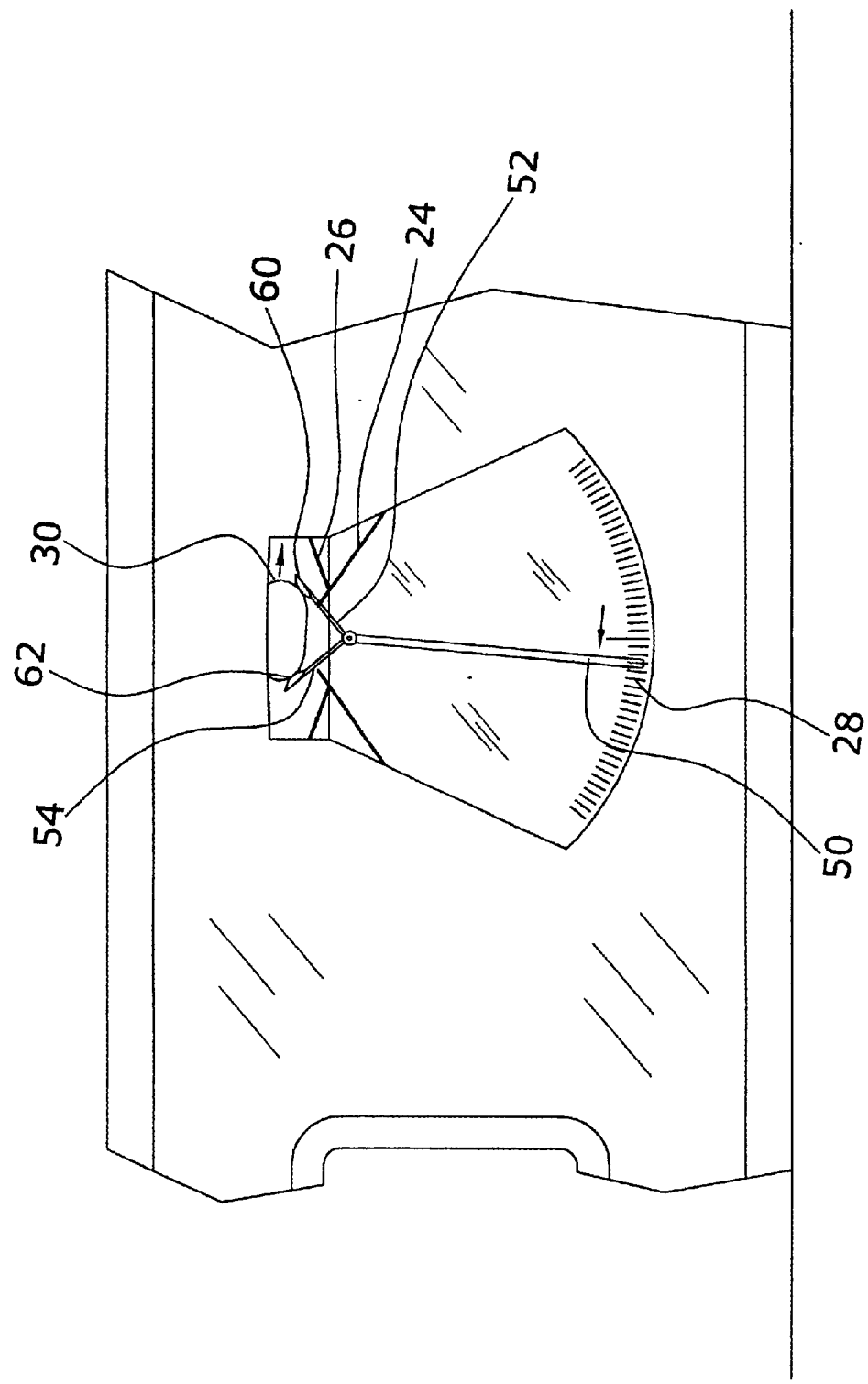
FIG. 4 is a front view of the present invention illustrating a surface having a raised right portion.
Figure 5:
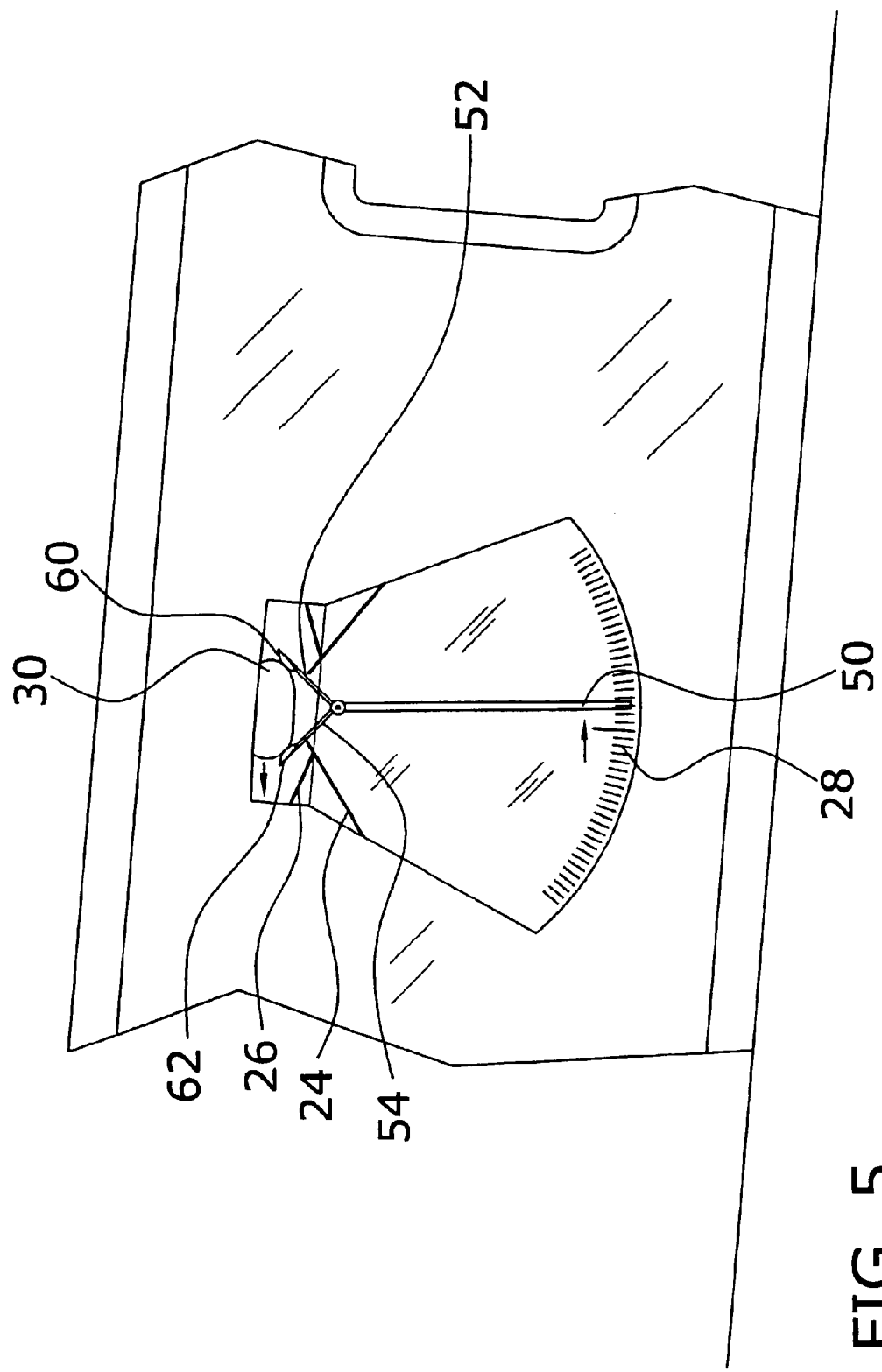
FIG. 5 is a front view of the present invention illustrating a surface having a raised left portion.

In use, the user positions a surface of the frame structure 12 retaining the present invention against a surface to be measured for levelness, plumbness or a specific angle. For example, FIG. 3 illustrates a surface being measured that is level since the indicator member 50 is aligned with the center indicia 28 of the measurement indicia 28. However, if the surface is not level the buoyant member 30 will move towards the higher portion of the upper compartment 22 which in turn moves the indicator member 50 accordingly as shown in FIGS. 4 and 5 of the drawings. The user is thereby able to achieve an accurate measurement of the levelness, plumbness or angle of a surface by monitoring the position of the indicator member 50 instead of having to attempt to guess the location of a traditional bubble vial.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore,the foregoing is considered as illustrative only of the principles of the invention further, since numerous modifications and changes will readily occur to those skilled in the art, it is not desired to limit the invention to the exact construction and in the operation shown and described, and accordingly, all suitable modifications and equivalents may be resorted to, falling within the scope of the invention.

| Index of Elements for Level System (TURN-006) |
|---|
| ENVIRONMENTAL ELEMENTS |
| 10. Level System |
| 11. |
| 12. Frame Structure |
| 13. |
| 14. |
| 15. |
| 16. |
| 17. |
| 18. |
| 19. |
| 20. Container |
| 21. |
| 22. Upper Compartment |
| 23. |
| 24. Lower Diverter |
| 25. |
| 26. Upper Diverter |

| -continued |
|---|
| Index of Elements for Level System (TURN-006) |
| 27. |
| 28. Measurement Indicia |
| 29. |
| 30. Buoyant Member |
| 31. |
| 32. |
| 33. |
| 34 |
| 35. |
| 36. |
| 37. |
| 38. |
| 39. |
| 40. Axle |
| 41. |
| 42. |
| 43. |
| 44. |
| 45. |
| 46. |
| 47. |
| 48. |
| 49. |
| 50. Indicator Member |
| 51. |
| 52. First Arm |
| 53. |
| 54. Second Arm |
| 55. |
| 56. |
| 57. |
| 58. |
| 59. |
| 60. First Paddle |
| 61. |
| 62. Second Paddle |
| 63. |
| 64. |
| 65. |
| 66. |
| 67. |
| 68. |
| 69. |
| 70. |
| 71. |
| 72. |
| 73. |
| 74. |
| 75. |
| 76. |
| 77. |
| 78. |
| 79. |

I claim:

1. A level system for indicating a levelness or plumbness of a surface, comprising:

a container containing a volume of liquid having an upper compartment;

a buoyant member positionable within said upper compartment;

a first paddle and a second paddle pivotally positioned within said container, wherein said first paddle and said second paddle are positioned on opposing sides of said buoyant member; and an indicator member attached to said paddles.

2. The level system of claim 1, wherein said container includes a plurality of measurement indicia, wherein said measurement indicia include a center indicia indicating level or plumb.

3. The level system of claim 2, wherein said container is at least partially transparent.

4. The level system of claim 2, wherein said upper compartment has an upper inner surface substantially transverse with respect to said center indicia.

5. The level system of claim 1, wherein said buoyant member is comprised of a bubble.

6. The level system of claim 1, wherein said buoyant member is comprised of a structure buoyant within said liquid.

7. The level system of claim 1, including a pair of lower diverters within said container for directing said buoyant member between said paddles.

8. The level system of claim 7, including a pair of upper diverters within said container that extend at an angle from said lower diverters respectively.

9. The level system of claim 8, wherein said lower diverters and said upper diverters form a V-shaped structure.

10. The level system of claim 9, wherein said lower diverters extend past said upper diverters and each contain a slot for receiving a portion of said paddles.

11. A level system for indicating a levelness or plumbness of a surface, comprising:

a container containing a volume of liquid having an upper compartment;

a buoyant member positionable within said upper compartment;

a first paddle connected to a first arm and a second paddle connected to a second arm pivotally positioned within said container, wherein said first paddle and said second paddle are positioned on opposing sides of said buoyant member;

an axle positioned within said container that pivotally supports said first arm and said second arm; and an indicator member attached to said paddles.

12. The level system of claim 11, wherein said container includes a plurality of measurement indicia, wherein said measurement indicia include a center indicia indicating level or plumb.

13. The level system of claim 12, wherein said container is at least partially transparent.

14. The level system of claim 12, wherein said upper compartment has an upper inner surface substantially transverse with respect to said center indicia.

15. The level system of claim 11, wherein said buoyant member is comprised of a bubble.

16. The level system of claim 11, wherein said buoyant member is comprised of a structure buoyant within said liquid.

17. The level system of claim 11, including a pair of lower diverters within said container for directing said buoyant member between said paddles.

18. The level system of claim 17, including a pair of upper diverters within said container that extend at an angle from said lower diverters respectively.

19. The level system of claim 18, wherein said lower diverters and said upper diverters form a V-shaped structure.

20. The level system of claim 19, wherein said lower diverters extend past said upper diverters and each contain a slot for receiving a portion of said paddles.

* * * * *